June 7, 1955   J. R. DUPPSTADT   2,710,047
ADJUSTABLE AIRCRAFT PILOT SEAT
Filed July 26, 1951   3 Sheets-Sheet 1
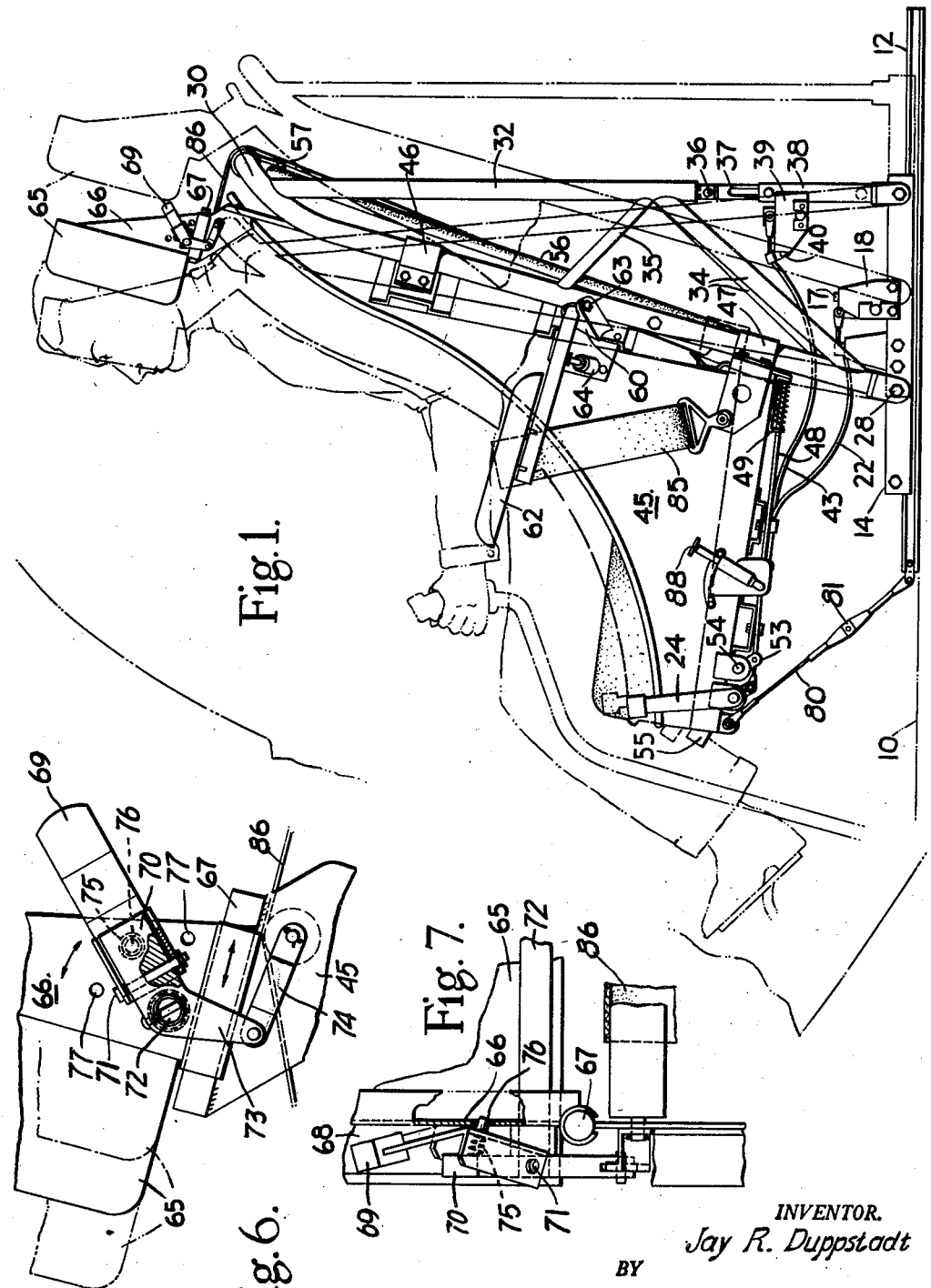
INVENTOR.
Jay R. Duppstadt
BY
Bean, Brooks, Buckley & Bean
ATTORNEYS.

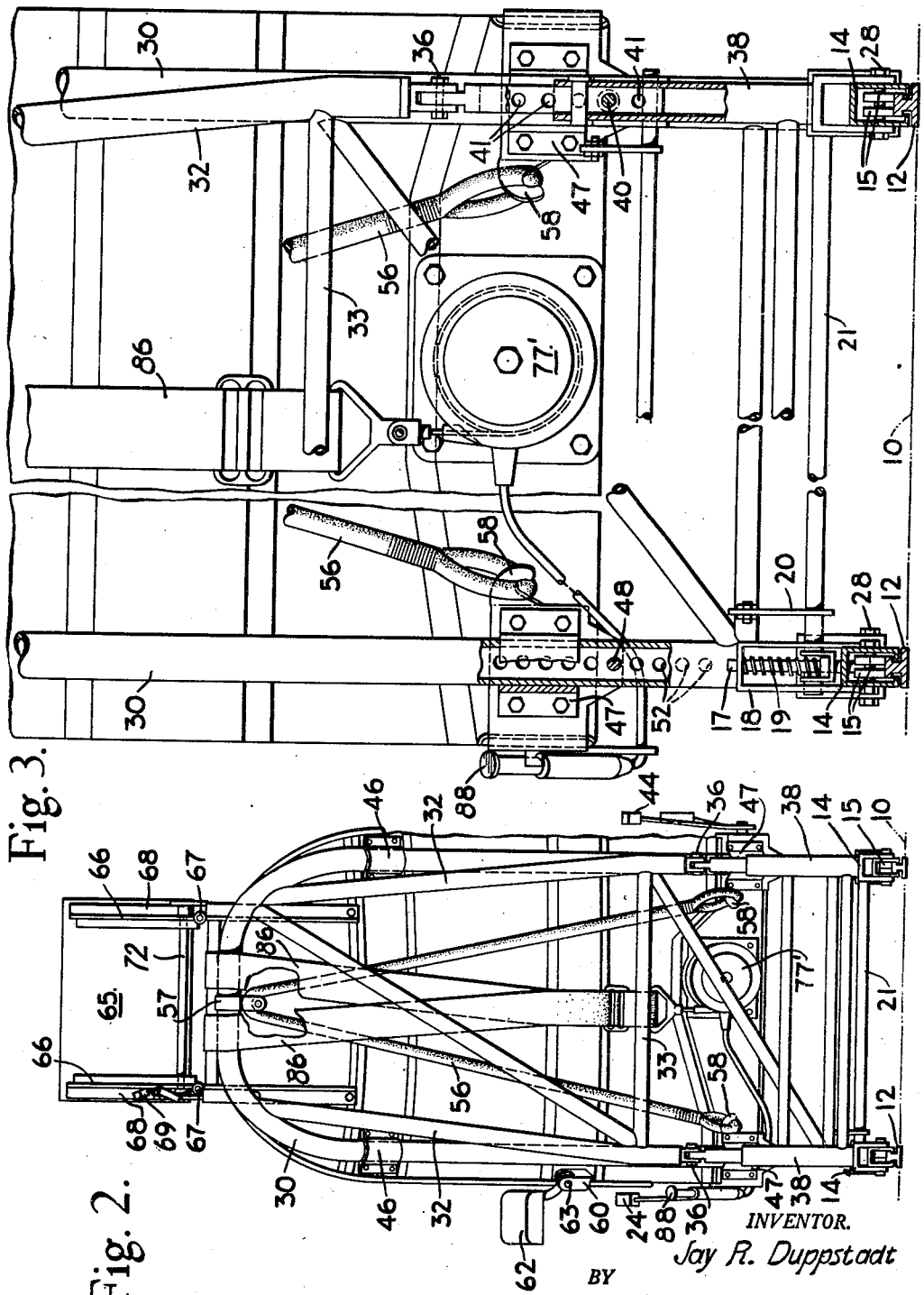

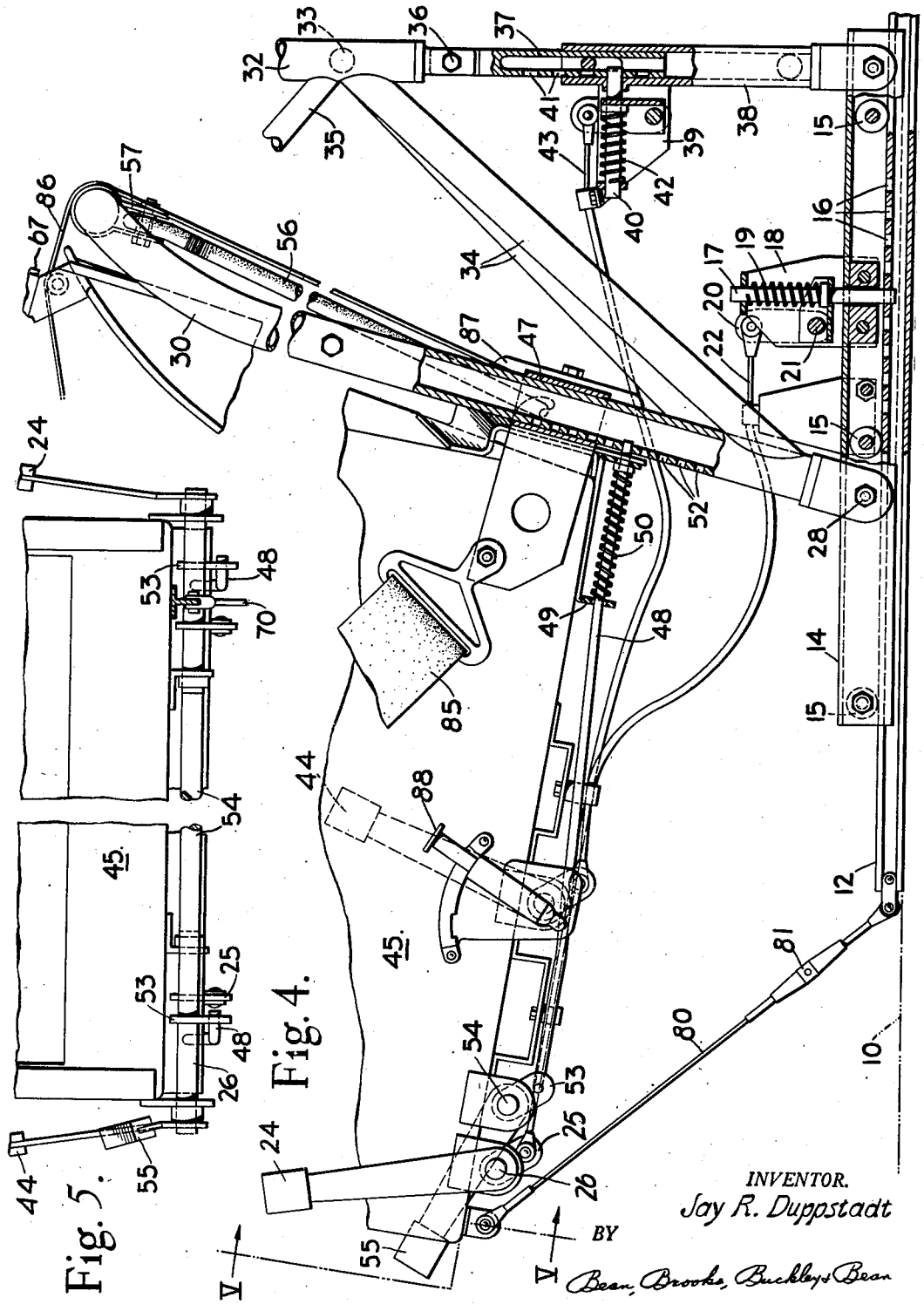

United States Patent Office 2,710,047
Patented June 7, 1955

2,710,047

ADJUSTABLE AIRCRAFT PILOT SEAT

Jay R. Duppstadt, Tonawanda, N. Y., assignor to Bell Aircraft Corporation, Wheatfield, N. Y.

Application July 26, 1951, Serial No. 238,725

8 Claims. (Cl. 155—5)

This invention relates to aircraft pilot seats, and more particularly to pilot seats designed especially for use in helicopter or other rotary wing type aircraft.

Whereas, it is known that vertically and horizontally adjustable and inclination adjustable seats have been previously provided in various passenger vehicles, the advent of helicopter type aircraft has created a new problem due to the tendency of the aircraft body to assume substantially different angles of pitch under different flight conditions. For example, the helicopter body assumes an angle of pitch in the direction of flight, and therefore it will be appreciated that the pilot's seat should preferably be readily adjustable to various angles of tilt, as well as being vertically and horizontally adjustable in order to render the seat suitable to different pilots. However, it is requisite that an aircraft pilot seat must under all conditions of adjustment be firmly positioned in the aircraft in order that the pilot may maintain full control of the ship; it is also apparent that it must possess the attributes referred to hereinabove while being at the same time extremely light in weight and rugged in its construction.

Thus, a primary object of the present invention is to provide an improved pilot seat for rotary wing aircraft or the like, which is readily adjustable both vertically and in fore and aft directions and in pitch relative to the aircraft body, and which is at the same time extremely light in weight and simple and rugged in construction.

Another object of the invention is to provide in conjunction with the pilot seat as aforesaid improved adjustment control mechanisms.

Another object of the invention is to provide a seat as aforesaid which features a mounting connection arrangement which is at the same time of improved strength and ruggedness and of improved compactness in form and so disposed as to avoid interferences with the other pilot compartment devices such as the aircraft control mechanisms or the like.

Other objects and advantages of the invention will appear in the specification hereinafter.

In the drawing:

Fig. 1 is a side elevational view of a pilot seat of the invention, showing the seat in different positions of fore and aft adjustment;

Fig. 2 is a rear elevation of the seat;

Fig. 3 is a fragmentary rear elevational view thereof, on a larger scale, with portions broken away to show the control mechanism;

Fig. 4 is a fragmentary side elevational view of the seat, on a larger scale, with portions thereof shown in section;

Fig. 5 is a fragmentary front view of the seat construction, taken along line V—V of Fig. 4;

Fig. 6 is a fragmentary side view of a portion of the head rest mount and control mechanism; and Fig. 7 is a fragmentary front view thereof.

As illustrated in the accompanying drawing, the seat of the invention is shown in conjunction with an aircraft body having a floor surface 10 to which are rigidly attached a pair of parallel seat rails 12—12 extending longitudinally of the aircraft. As shown in Figs. 2–3, the rails 12—12 are of I beam section and mount thereon C-sectioned sills 14—14. The sills 14—14 mount rollers 15 therein, whereby the sills 14 are longitudinally slidable relative to the rails 12 while the bottom inturned edges of the sills embrace the top flange portions of the rails 12 so as to prevent upward displacement of the sills from the rails. The top flange portions of the rails are drilled as indicated at 16 (Fig. 4) to accommodate the end of a latch pin 17 carried by a bracket 18 mounted on one of the sills. A spring 19 normally biases the pin 17 downwardly into latching engagement with the holes 16 of the bottom rail, thus holding the sill in any adjusted position relative to the rail. A bell crank 20 is pivoted upon the bracket 18 as indicated at 21 and arranged to be actuated by a pull cord 22 which in turn connects to a pilot control lever 24 by means of a link 25 and shaft 26.

The sills 14—14 comprise opposite base members of the seat supporting structure; the support structure comprising a rigid truss fabricated of metal tubing pivotally connected to the sills 14—14 at clevis attachment points 28—28. The truss structure comprises in rear view an essentially U-shaped bent member 30 which terminates at its lower ends in the clevis connections 28—28 with the sills 14—14, and a pair of rear tubes 32—32 which extend from welded connections at their top ends with the bent tube 30 straight downwardly and spaced to the rear of the legs of the bent member 30. Adjacent their lower ends the rear legs 32—32 are rigidly interconnected by a transverse tube 33, and diagonal brace tubes 34—34 are welded to the lower ends of the tubes 32 and to the lower ends of the bent tube 30 to complete the truss formation. Intermediate brace tubes 35 are also illustrated as being provided to further rigidly brace the truss structure. Thus, it will be understood that this truss structure constitutes an integral unit which is freely pivotable about the connections 28—28 except as restrained, as will be explained hereinafter.

The bottom ends of the tubes 32—32 pivotally connect as indicated at 36 to control tubes 37 (Fig. 4) which telescopically fit into corresponding bottom tubes 38—38. One of the tubes 38 carries a fixed bracket 39 in which is mounted a slidable latch pin 40, and the corresponding tube 37 is perforated vertically as indicated at 41 to receive the latch pin 40 so as to lock the telescopic tube members 37—38 together in any adjusted vertical position relationship. A compression spring 42 carried by the bracket 39 normally biases the pin 40 toward locking position, and a pull wire 43 is provided for pilot control through a lever 44 so as to release the latch pin against the action of the spring. Thus, it will be appreciated that release of the latch pin 40 will permit the entire truss structure to rock about the aligned pivot connections 28—28, for purposes which will be explained in detail hereinafter.

The seat proper is indicated at 45 to comprise a sheet metal "bucket" type seat having paired top and bottom bearing bracket devices 46—47 embracing the corresponding side leg portions of the bent tubular member 30 of the truss structure. Thus, the seat bucket 45 is carried by the tubular member 30 to be vertically slidable thereon, and to hold the seat in various vertically adjusted positions on the truss member there is provided a latch bar 48 carried by a bracket 49 extending from the seat bucket and arranged to be normally biased by a compression spring 50 into one of a number of apertures 52 formed through the wall of the bent tube 30. As shown in Fig. 4, the latch bar 48 extends into pivotal connection with a crank 53 which in turn is keyed to a shaft 54 arranged to be manually controlled by a pilot control lever 55. An elastic cord 56 is hung from a suspension bracket 57 at the top end of the bent tube 30 and is connected at its lower opposite end portions by means of hook and eye connections 58 to the bucket seat brackets 47—47; the elastic cord 56 being tensioned so as to substantially overcome the weight of the bucket seat assembly and to thereby bias the latter upwardly relative to the support truss structure. Thus, it will be appreciated that whenever the pilot wishes to lower the bucket seat relative to the support truss, he merely places his weight upon the seat and pulls upon the control lever 55 so as to release the latch bar 48. Then, when the seat assumes the desired lowered position the latch control is released so as to thereby lock the seat in the desired vertical position. On the other hand, whenever it is desired to raise the seat to some higher elevation, the pilot's weight is temporarily removed from the seat and the latch mechanism is released whereupon the elastic cord 56 will operate to pull the bucket seat upwardly to the desired elevation, whereupon the latch mechanism is permitted to again assume a locked condition.

The seat bucket 45 carries at its opposite sides hinge brackets 60 upon which are pivoted arm rests 62; the hinge axes of the arm rests being skewed rearwardly and downwardly, as indicated at 63 so that whenever the arm rests are folded upwardly out of operative position they are automatically withdrawn into positions behind the pilot seat thus avoiding interferences with restricted passageways alongside the seat. As shown in Fig. 1, a suitable stop device 64 may be employed to limit the downward hinging movement of the arm rests; said stop devices being preferably adjustable so that the arm rests may also be adjusted relative to the bucket seat when in operative position.

A head rest 65 is preferably carried at the top of the bucket seat, and may be arranged to be readily adjustable thereon by means of wing brackets 66 which extend from axially slidable connections 67—67 at the top of the bucket seat (Figs. 6-7). The head rest 65 is connected to the wing brackets 66 by means of angles 68 on the back of the head rest 65 (Fig. 2). The wing brackets 66—66 are positionally controlled on the slides 67—67 by means of a hand lever 69 which pivotally connects to a bell crank 70 by means of a pin 71. The crank 70 is keyed to one end of a cross shaft 72 carried by the wing brackets, and at its opposite ends the shaft 72 carries crank arms 73 which pivotally connect to corresponding bearing links 74 in turn pivotally bearing upon the bucket seat 45. Thus, manual displacements of the lever 69 will force the head rest 65 to move fore and aft upon the slide connections 67—67. To hold the lever 69 in any adjusted position a compression spring 75 is placed between the bell crank 70 and the lever 69 to bias the latter inwardly toward the wing bracket whereby a pin 76 thrusts into one of a series of holes 77 punched in the wing bracket. To release the lever it is simply pulled out against the spring 75 so as to release the pin 76, whereupon rocking of the lever will move the head rest; the motion being synchronized at both ends by the rod 72.

As shown in Figs. 1 and 4, a device for limiting the forward travel of the seat unit may be employed if desired in the form of a cable 80 having connections at opposite ends to the fixed bottom rails 12—12 and to the seat bucket 45; a turn buckle or the like, as indicated 81 being supplied in each of the cables 80 for adjustment of the length thereof. Thus, the cables may be set so that the seat bucket is prevented from being adjusted forwardly to such a position as to interfere with the aircraft control mechanisms or the like.

Because the cable 80 extends diagonally from the track 12 to the front edge of the seat, it prevents such combinations of seat adjustments as might interfere with the aircraft controls. For example, when the seat is full forward, the cable prevents full upward displacement or tilting of the seat; whereas when the seat is back the cable permits full upward displacement and/or tilting.

Thus, it will be appreciated that the seat construction of the invention provides complete and ready adjustability of the pilot seat both in fore and aft directions and in vertical directions, as well as tilting of the seat so as to permit the pilot to assume the most comfortable attitudes under varying conditions of flight. Also, it will be appreciated that the features and advantages referred to hereinabove are attained by the construction of the invention through use of only relatively light weight parts while the completed structure is of unusually rugged and strong construction. Also, the construction permits application of all necessary accessory devices such as for example the standard seat harness including a seat strap 85 and shoulder straps 86 and the inertia reel unit 77' therefor which may be readily carried by the rear surface of the bucket seat and arranged to be controlled as by the conventional harness control device illustrated at 88. It is a particular feature and advantage of the seat mounting arrangement of the invention that the sills 14—14 extend forwardly to a sufficient distance and carry at the forward ends thereof rollers 15—15 at positions well ahead of the center of gravity of the seat and pilot when seated therein. Thus, the weight of the unit is disposed rearwardly of the front rollers 15, and consequently downward loads are always imposed upon the rear rollers 15. This enables the roller system to operate under ideal conditions and thereby facilitates easy fore and aft adjustments of the seat while at the same time avoiding disposition of support devices at points such as would interfere with the pilot seat and/or the aircraft control mechanisms.

I claim:

1. An aircraft pilot seat comprising in combination, fore and aft slide rail means, base means slidable on said rail means, a seat support of truss frame form pivotally connected to said base means for rocking as a unit thereon about a transverse horizontal axis, telescopic strut means interconnecting said support and said base means at positions spaced from said pivot axis and length-adjustable to control the angle of said seat support relative to said base and slide rail means, a seat member mounted upon said seat support by vertical adjustment connection means, and manual control means for latching control of fore and aft movements of said support upon said slide means and of pivoting movements of said support relative to said slide means and of vertical sliding movements of said seat relative to said seat support.

2. An aircraft passenger seat comprising in combination, fore and aft adjustable base means, a seat support of rigid frame form pivotally connected to said base means for rocking as a unit thereon about a transverse horizontal axis, adjustable strut means interconnecting said support and said base means at positions spaced from said axis and adjustable to control the inclination of said seat support relative to said base means, and a seat member mounted upon said seat support by vertical positionally adjustable connection means.

3. An aircraft passenger seat comprising in combination, fore and aft adjustable base means, a seat support of rigid frame form pivotally connected to said base means for rocking as a unit thereon about a transverse horizontal axis, adjustable strut means interconnecting said support and said base means at positions spaced fr said axis and adjustable to control the inclination of s  seat support about said axis relative to said base means, a seat member mounted upon said seat support by v rtical positional adjustments connection means, and justable-length tension means interconnecting said means and said seat support and operable to limit upward and forward and tilting movements of said seat support relative to said base means to prevent adjustment of said seat member beyond predetermined p  tions.

4. An aircraft seat comprising in combination, fixed fore and aft rail means, sill means slidable on said rail means, a seat support of truss frame form pivotally connected to said sill means for rocking as a unit thereon about a transverse horizontal axis, adjustable length strut means interconnecting said support and said sill means at positions spaced from said axis to control the angle of said seat support about said axis relative to said sill means, and manual control means for latching control of fore and aft movements of said support upon said rail means and of pivoting movements of said support relative to said sill means.

5. An aircraft passenger seat as set forth in claim 2, together with adjustable-length tension means interconnecting said base means and said seat member and operable to limit upward movements of said seat member relative to said base means to prevent adjustment of said seat member beyond predetermined positions.

6. An aircraft passenger seat as set forth in claim 2, together with adjustable-length tension means interconnecting said base means and said seat member and operable to limit tilting movements of said seat support relative to said base means to prevent adjustment of said seat member beyond predetermined positions.

7. An aircraft passenger seat comprising in combination, fore and aft adjustable base means, a seat support of rigid frame form pivotally connected to said base means for rocking as a unit thereon about a transverse horizontal axis, adjustable strut means interconnecting said support and said base means at positions spaced from said axis and adjustable to control the inclination of said seat support relative to said base means, a seat member mounted upon said seat support by vertical positionally adjustable connection means, and arm rest means at each side of said seat member, said arm rest means being connected to said seat member by an oblique angle pivot device for movement rearwardly behind said seat member.

8. An aircraft passenger seat comprising in combination, fore and aft adjustable base means, a seat support of rigid frame form pivotally connected to said base means for rocking as a unit thereon about a transverse horizontal axis, adjustable strut means interconnecting said support and said base means at positions spaced from said axis and adjustable to control the inclination of said seat support relative to said base means, a seat member mounted upon said seat support by vertical positionally adjustable connection means, a head rest adjustably carried by said seat member by means of fore and aft sliding connection means, and manually releasable latch means normally locking said head rest in adjusted position relative to said seat member.

References Cited in the file of this patent

UNITED STATES PATENTS

| | | |
|---|---|---|
| 2,242,081 | Long | May 13, 1941 |
| 2,292,414 | Vernon | Aug. 11, 1942 |
| 2,383,173 | Watter | Aug. 21, 1945 |

FOREIGN PATENTS

| | | |
|---|---|---|
| 853,982 | France | Dec. 23, 1939 |